3,479,088
DEVICE FOR PIVOTABLY MOUNTING IN INCLINABLE BACKREST OF A SEAT AND A SEAT INCLUDING SAID DEVICE
Michel Bonnaud, Montbeliard, France, assignor to Automobiles Peugeot, a France body corporate, Paris, France, and Regie Nationale des Usines Renault, a French body corporate
Filed Dec. 26, 1967, Ser. No. 693,219
Claims priority, application France, Jan. 9, 1967, 90,363
Int. Cl. B60n 1/06
U.S. Cl. 297—373    7 Claims

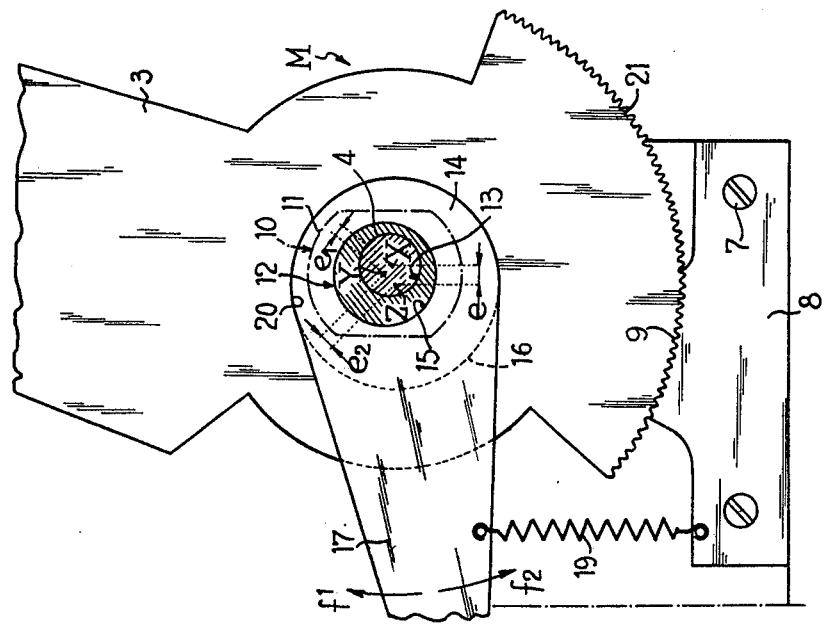

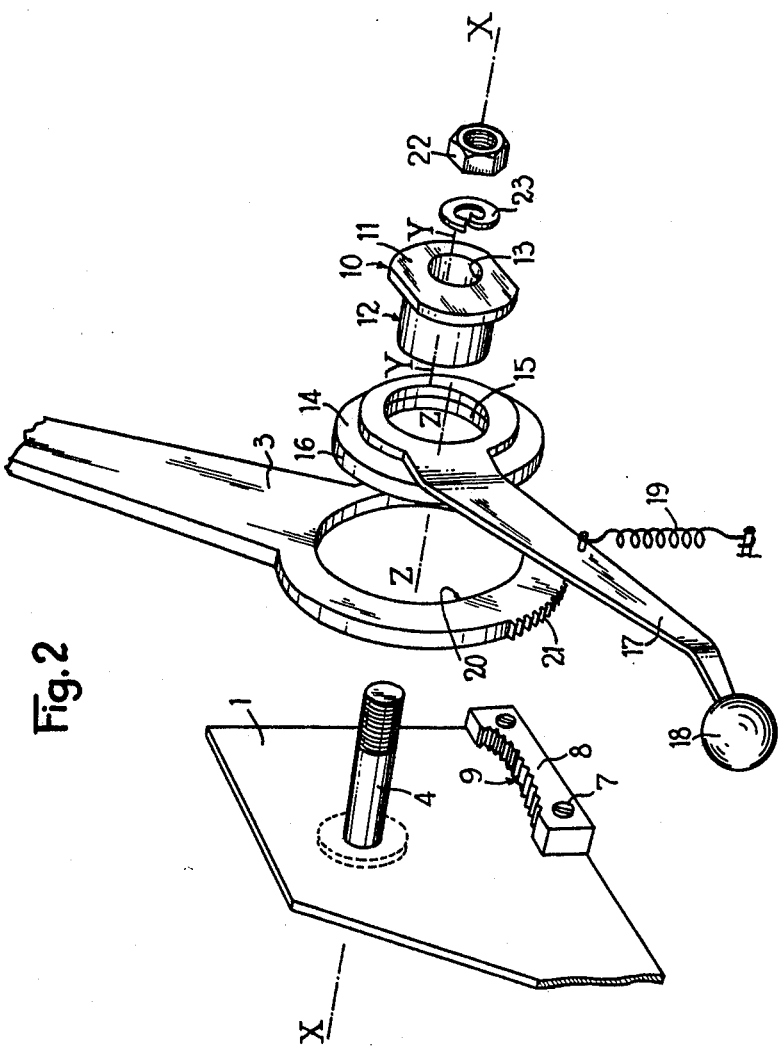

ABSTRACT OF THE DISCLOSURE

A pivotal device for pivoting an inclinable backrest to the fixed support of a seat, the device including a toothed sector engageable with a toothed locking element fixed to the support, the toothed sector being mounted on the pivot pin connecting the backrest to the support through eccentric means whereby rotation of the eccentric means releases the teeth of the sector from the teeth of the locking element for adjusting the inclination of the backrest.

---

The present invention relates to inclinable backrests of seats and in particular seats for automobile vehicles.

The vast majority of seats having inclinable backrests are equipped with adjusting devices including toothed sectors.

As the annular setting required is rather small (usually 3–6°), and the radius of the toothed sector is small, for reasons of limited overall size, the teeth are usually triangular in shape. A sector provided with such teeth and prevented from rotating by a simple pawl or slidable element constitutes a reversible mechanism owing to the angle of the flanks of the teeth.

For this reason, all the devices of this type known at the present time comprise the following combination: a toothed sector integral with the backrest to be adjusted, a pivotable or slidable toothed locking element and irreversible means for maintaining the locking element in its operative position and consisting of for example a cam, eccentric, wedge or toggle arrangement.

The object of the present invention is to provide a device for pivotably mounting an adjustable backrest of a seat which is much simpler, reduces play, improves the stiffness and yet is much cheaper than known devices.

The invention provides a device comprising in combination: a support plate adapted to be fixed to the fixed support of the seat and provide with a fixed pivot pin and a fixed toothed locking element; an eccentric plate integral with an actuating lever and rotatably mounted on said pin; and a member adapted to be fixed to the inclinable backrest and rotatably mounted on said eccentric plate and including a toothed sector which is integral therewith and adapted to co-operate with said toothed locking element.

By means of this device, it is sufficient to rotate the eccentric plate in either direction by means of the actuating lever to raise said backrest member and disengage the toothed sector from the teeth of the locking element or to lower said member.

According to another feature, interposed between the eccentric plate and the fixed spindle is an eccentric sleeve adjustable in rotation for taking up play.

Another object of the invention is to provide a seat having an inclinable backrest, wherein said backrest is connected to the fixed support of the seat on at least one side by the aforementioned device.

Preferably, on the opposite side, the seat is pivotably mounted on a journal whose axis coincides with the axis of the fixed pivot pin of the device, the vertical movements of the member rotating on the eccentric plate being compatible with said journal owing to an elastic deformation of the framework of the backrest or by a deformable elastically yieldable pivotal mounting compatible with said vertical movements of said member of the device.

Further features and advantages of the invention will be apparent from the ensuing description with reference to the accompanying drawings.

In the drawings:

FIG. 1 is a diagrammatic front elevational view, with a part cut away, of the assembly of an inclinable backrest according to the invention;

FIG. 2 is an exploded perspective view of the pivotal means of the backrest according to the invention, and FIG. 3 is a diagrammatic side elevational view, with a sectional view taken along line 3—3 of FIG. 1, of the device on an enlarged scale.

According to the illustrated embodiment, the invention is applied to a seat the support of which has merely been shown partially in the form of parallel vertical plates 1 and 1ª (FIG. 1), whereas the backrest is diagrammatically represented by the contour 2 of its framework in the form of a cradle. Mounted on said framework in any manner (for example by riveting, welding or screwing) are two members 3 and 3ª adapted to be pivoted to plates 1 and 1ª to pivot about a transverse axis.

The member 3ª is pivoted to the plate 1ª by a journal 4ª consisting of a simple bolt having an axis X—X and a nut 5ª.

The member 3 is pivoted to the plate 1 by the device M according to the invention which is shown in section in FIG. 1, in perspective in FIG. 2 and in front elevation and partly in section in FIG. 3.

Attached to the plate 1 by a weld at 6 or other means is a pivot pin 4 which is coaxial with the journal 4ª on axis X—X. Moreover, connected to the outer face of the plate 1ª by screws 7 or rivets and/or welding is a metal plate 8 constituting a locking element owing to the provision of a curved series of teeth 9 having a radius R (see FIG. 3).

Rotatably mounted on the pin or journal 4 is a sleeve 10 having a flange 11 and an outer face 12 which is eccentric to the extent of $e^1$ relative to the cylindrical face of its bore 13 so that upon rotation, on the pin 4, the axis Y—Y of its outer face turns about the axis X—X and can thus be brought to any desired angular position, such as that shown in FIG. 3.

Journalled on the eccentric face 12 of the sleeve 10 which is a sleeve adapted to take up play, as will be explained hereinafter, is an eccentric plate 14. The bore 15 of this plate is eccentric relative to the outer cylindrical face 16 to an extent $e^2$ which is for example equal to $e^1$ so that when this eccentric plate 14 is rotated on the eccentric face 12 of the sleeve 1, the axis Z—Z of the outer face 16 of the eccentric face 14 can be rendered eccentric relative to the axis X—X to an extent $e$ which, upon rotation of the plate 14, can vary between a minimum value equal to the difference between the eccentricities $e^1$ and $e^2$ (and consequently equal to 0 if the two eccentricities are equal) to a maximum value equal to the sum $e^1+e^2$.

The eccentric plate 14 is rigidly fixed to an actuating lever 17 which terminates in a handle 18, whereby this plate can be pivoted on the sleeve 10 in the direction of arrow $f^1$ or in the opposite direction indicated by arrow $f^2$ in FIG. 3.

A return spring 19 (FIGS. 2 and 3) biases the lever 17 and consequently the eccentric plate 14 in the direction of arrow $f^2$ which tends to decrease the eccentricity $e$.

Mounted on the outer cylindrical face 16 of the eccentric plate by means of an aperture 20 is the member 3 adapted to be rigidly secured to the frame 2 of the backrest 3. This frame comprises, facing the locking element 8, a toothed sector 21 having a radius R equal to that of teeth 9 of the element 8.

The device is maintained on the pin 4 by a nut 22 locked in position by a collar 23, this nut locking the sleeve 10 as concerns rotation in the selected angular position of adjustment.

The device operates in the following manner:

When the eccentric control plate 14 rotates about the axis Y—Y of the outer face 12 of the sleeve 10, it imparts to the member 3 and in particular to the sector 21, a downward movement when this lever rotates in a direction of arrow $f^2$ and thus brings the sector 21 into engagement with the fixed teeth 9 of the element 8. Rotation of the plate 14 and the control lever 16 in the direction of arrow $f^2$ is brought about by the spring 19 and the rotation only stops when the fixed teeth 9 and movable teeth 21 are firmly engaged with each other.

At this moment, the condition of the eccentric control plate is such that the device is perfectly irreversible and the backrest D is locked in the position of inclination imparted thereto when the teeth 9 and 21 were previously separated.

To release the backrest and modify its inclination, the backrest must be unlocked. For this purpose, the operator effects a movement opposed to the preceding movement. He raises the lever 17 in the direction of arrow $f^1$ in opposition to the action of the spring 19.

The eccentric control plate 14 imparts to the member 3 and the sector 21 an upward movement resulting in the total disengagement of the teeth. This movement is compatible with the journal $4^a$ owing to the possibilities of elastic deformation of the cradle 2 constituting the frame of the seat, this frame being deformed as shown by the dot-dash line $2^a$ in FIG. 1.

After the teeth 9 and 21 have been disengaged, the operator, who still holds the lever 17 in the raised position, can pivot the backrest so as to adjust the inclination thereof as desired. In releasing the lever 17 the spring 19 results in a further locking.

The function of the eccentric sleeve 10 is as follows: If the various parts indispensable to the above-described operation, namely the pin 4, the eccentric plate 14, the member 3 and toothed sector 21 were manufactured with high precision, these parts would be sufficient. However, as this condition is not satisfied in a precise manner owing to considerations of cost, the eccentric adjusting sleeve 10 permits adjusting to the best extent the conditions of engagement of the teeth 9 and 21 and the operation of the eccentric plate 14 by means of parts having relatively low precision. The adjusting eccentric sleeve 10 rotates on the fixed pin 4 and is blocked in the desired position by the nut 22.

The device described hereinbefore has the aforementioned advantages namely: it is simple, since it eliminates the conventional movable pawl and the guiding of the latter, this pawl and guiding being replaced by the toothed element 8.

Play is reduced and stiffness improved owing to the eccentric sleeve 10 which takes up any possible play.

The assembly is simple in construction and consequently very cheap.

Although a specific embodiment of the invention has been described, many modifications and changes may be made therein without departing from the scope of the invention as defined in the appended claims.

If desired, the pivotal mounting of the backrest on the side opposed to the device M could permit a pivoting without deformation of the frame 2 of the backrest and the latter itself in the course of the vertical movements of the member 20, for example by providing between the journal $4^a$ and the member $3^a$ an element of an elastomer or plastics materials.

Further, two devices M could be provided placed on each side of the seat, their eccentric plates being rigidly interconnected by a sleeve.

The reinforcement 3 could be part of the same material as the frame of the backrest of the seat.

Having now described my invention what I claim as new and desire to secure by Letters Patent is:

1. A pivotal device for mounting an inclinable backrest of a seat on a relatively fixed support of said seat, said device comprising in combination: a support plate fixed to said support, a fixed pivot pin fixed to said support plate, a toothed locking element fixed to said support plate, an eccentric plate rotatably mounted on said pin and having an outer cylindrical bearing surface which is eccentric with respect to said pivot pin, an actuating lever integral with or fixed to said eccentric plate, said locking element having an arcuate toothing concentric with respect to said outer bearing surface of the eccentric plate, a member fixed to said backrest and rotatably mounted on said outer bearing surface of the eccentric plate, said member including at its periphery an integral toothed sector which is concentric with respect to said outer bearing surface and engages said toothed locking element for a predetermined angular position of said actuating lever and said eccentric plate, and which can be disengaged from said toothed locking element by rotating said actuating lever and said eccentric plate for pivoting the backrest with respect to the support.

2. A device as claimed in claim 1, comprising an eccentric sleeve adjustable in rotation for taking up play and interposed between an inner bearing surface of the eccentric plate and the fixed pin.

3. A seat comprising a relatively fixed support, an inclinable backrest, and a pivotal device connecting said backrest to said support, said device comprising in combination: a support plate fixed to said support, a fixed pivot pin fixed to said support plate, a toothed locking element fixed to said support plate, an eccentric plate rotatably mounted on said pin and having an outer cylindrical bearing surface which is eccentric with respect to said pivot pin, an actuating lever integral with or fixed to said eccentric plate, said locking element having an arcuate toothing concentric with respect to said outer bearing surface of the eccentric plate, a member fixed to said backrest and rotatably mounted on said outer bearing surface of the eccentric plate, said member including at its periphery an integral toothed sector which is concentric with respect to said outer bearing surface and engages said toothed locking element for a predetermined angular position of said actuating lever and said eccentric plate, and which can be disengaged from said toothed locking element by rotating said actuating lever and said eccentric plate for pivoting the backrest with respect to the support.

4. A seat as claimed in claim 3, wherein said pivotal device is provided on only one lateral side of the seat, a journal coaxial with said pivot pin pivotably interconnecting said backrest and said fixed support being provided on the side of said seat remote from said pivotal device, said backrest comprising an elastically deformable frame which allows vertical movements of said member.

5. A seat as claimed in claim 3, wherein said pivotal device is provided on only one lateral side of the seat, an elastically yieldable pivotal mounting coaxial with said pivot pin pivotably interconnecting said backrest and said fixed support being provided on the side of said seat remote from said pivotal device.

6. A seat as claimed in claim 3, wherein said backrest has a frame and said member is attached to said frame.

7. A seat as claimed in claim 6, wherein said backrest has a frame and said member is part of said frame.

References Cited

UNITED STATES PATENTS

| 2,745,471 | 5/1956 | Chappuis et al. | 297—374 |
| 2,972,374 | 9/1961 | McKey | 297—374 |
| 3,315,298 | 4/1967 | Strien et al. | 297—374 |
| 3,333,892 | 8/1967 | Werner et al. | 297—379 |
| 3,343,872 | 9/1967 | Werner et al. | 297—362 |
| 3,401,979 | 9/1968 | Putsch | 297—362 |

FOREIGN PATENTS

| 218,885 | 12/1961 | Austria. |
| 223,979 | 7/1959 | Australia. |
| 665,001 | 2/1961 | Italy. |

BOBBY R. GAY, Primary Examiner

G. O. FINCH, Assistant Examiner

U.S. Cl. X.R.

297—362